United States Patent
Kesavarapu (10) Patent No.: US 8,020,101 B2
(45) Date of Patent: Sep. 13, 2011

(54) USER SPECIFIED TRANSFER OF DATA BETWEEN APPLICATIONS

(75) Inventor: Screenivasulu Kesavarapu, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 10/850,535

(22) Filed: May 20, 2004

(65) Prior Publication Data

US 2005/0262521 A1    Nov. 24, 2005

(51) Int. Cl.
G06F 3/00 (2006.01)
G06F 3/048 (2006.01)

(52) U.S. Cl. ........ 715/724; 715/530; 715/537; 715/769; 715/779; 715/810; 719/329

(58) Field of Classification Search ................. 715/769, 715/724, 779, 810, 537, 530; 719/329; 354/764
See application file for complete search history.

(56) References Cited

U.S. PATENT DOCUMENTS

| | | | | |
|---|---|---|---|---|
| 5,301,268 A * | 4/1994 | Takeda | | 719/329 |
| 5,376,945 A * | 12/1994 | Takenaka et al. | | 715/810 |
| 5,467,448 A * | 11/1995 | Hilton et al. | | 715/235 |
| 5,606,674 A * | 2/1997 | Root | | 715/769 |
| 5,801,693 A * | 9/1998 | Bailey | | 715/769 |
| 5,828,376 A * | 10/1998 | Solimene et al. | | 715/821 |
| 6,005,566 A * | 12/1999 | Jones et al. | | 715/788 |
| 6,061,058 A * | 5/2000 | Owens et al. | | 715/769 |
| 6,411,611 B1 * | 6/2002 | van der Tuijn | | 370/337 |
| 6,466,238 B1 * | 10/2002 | Berry et al. | | 715/847 |
| 6,763,377 B1 * | 7/2004 | Belknap et al. | | 709/223 |
| 6,944,821 B1 * | 9/2005 | Bates et al. | | 715/530 |
| 6,961,907 B1 * | 11/2005 | Bailey | | 715/770 |
| 7,600,197 B2 * | 10/2009 | Gourdol et al. | | 715/817 |
| 7,770,127 B2 * | 8/2010 | Nittynen | | 715/770 |
| 2001/0034743 A1 * | 10/2001 | Thomas | | 707/501.1 |
| 2002/0016187 A1 * | 2/2002 | Hirayama et al. | | 455/566 |
| 2002/0080179 A1 * | 6/2002 | Okabe et al. | | 345/769 |
| 2002/0175955 A1 * | 11/2002 | Gourdol et al. | | 345/821 |
| 2002/0194300 A1 * | 12/2002 | Lin et al. | | 709/217 |
| 2003/0128820 A1 * | 7/2003 | Hirschberg et al. | | 379/88.14 |
| 2004/0015539 A1 * | 1/2004 | Alegria et al. | | 709/203 |
| 2004/0021700 A1 * | 2/2004 | Iwema et al. | | 345/863 |
| 2004/0070622 A1 * | 4/2004 | Cossey et al. | | 345/769 |
| 2005/0172241 A1 * | 8/2005 | Daniels et al. | | 715/770 |
| 2005/0198581 A1 * | 9/2005 | Soderberg et al. | | 715/770 |
| 2005/0210401 A1 * | 9/2005 | Ketola et al. | | 715/770 |
| 2006/0039184 A1 * | 2/2006 | Abraham et al. | | 365/158 |
| 2007/0192554 A1 * | 8/2007 | Higaki et al. | | 711/162 |

OTHER PUBLICATIONS

Karp et al., "Window XP in s NutShell," Apr. 2002, O'Reilley. http://proquest.safaribooksonline.com/0596002491.*

(Continued)

Primary Examiner — Steven P Sax
Assistant Examiner — Linh K Pham
(74) Attorney, Agent, or Firm — Michael J. Buchenhomer; Vazken Alexanian (57) ABSTRACT

A method, information processing system and computer readable medium for transferring data between applications on a computer is disclosed. The method includes selecting data from a first application and selecting a copy-to command for copying the data selected from the first application. The method further includes selecting a second application as a destination for the data selected. The method further includes copying the data selected to a location in the second application.

12 Claims, 4 Drawing Sheets

OTHER PUBLICATIONS

Screen Shot (Microsoft Corporation. Microsoft Windows XP Professional; 4 pages).*

Karp et al., "Window XP in s NutShell," Apr. 2002, O'Reilley. http://proquest.safaribooksonline.com/0596002491.*

* cited by examiner

USER SPECIFIED TRANSFER OF DATA BETWEEN APPLICATIONS

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of user interfaces for information processing systems and more particularly relates to the field of graphical user interfaces for computers, handheld devices, mobile telephones and other small information processing devices.

BACKGROUND OF THE INVENTION

Word processing and document editing is a common task performed by millions of computer users every day. In current computer environments, the process for copying or transferring data from one computer application to another, otherwise known as "cut and paste" or "copy and paste," involves a series of steps. Typically, these steps include opening a first application, selecting data from an instance of the first application, copying or cutting the selected data to a clipboard, opening a second application, selecting a location in an instance of the second application and inserting the selected data at the selected location of the second application. In one example, the Help utility of the Microsoft Word 2002 word processor, available from Microsoft Corporation of Redmond, Wash., offers the following instructions for copying and pasting, "Select the item you want to move or copy. Do one of the following: 1) to move the item, click the cut button on the toolbar, 2) to copy the item, click the copy button on the toolbar. To move or copy the item to another document, switch to the other document. Click on the location in the other document where you want the item to appear. Click the paste button on the toolbar."

This copy and paste process can be lengthy and cumbersome, especially if the user desires to perform a simple task, such as selecting a word and searching the web for that word or selecting data and performing an action on the selected data. Additionally, this process can be protracted and burdensome if the user is operating a small information processing device such as a mobile telephone, a handheld computer or a personal digital assistant (PDA), which have limited user interfaces. Therefore, a need exists to overcome the problems with the prior art as discussed above, and particularly for a way to simplify the task of copying data between computer applications.

SUMMARY OF THE INVENTION

Briefly, according to an embodiment of the present invention, a method for transferring data between applications on a computer is disclosed. The method includes selecting data from a first application and selecting a copy-to command for copying the data selected from the first application. The method further includes selecting a second application as a destination for the data selected. The method further includes copying the data selected to a location in the second application.

Also disclosed is an information processing system for transferring data between applications on a computer. The information processing system includes a graphical user interface for displaying a copy-to command. The information processing system further includes a processor configured to respond to a user selection of the copy-to command, an indication of text selected in a first application and a selection of a second application by reading the selected text, copying the selected text and writing the selected text to a location in the second application.

The method can also be implemented as machine executable instructions executed by a programmable information processing system or as hard coded logic in a specialized computing apparatus such as an application-specific integrated circuit (ASIC). Thus, also disclosed is a computer readable medium including computer instructions for transferring data between applications on a computer. The computer readable medium includes instructions for receiving a selection of data from a first application and receiving a selection of a copy-to command for copying the data selected from the first application. The computer readable medium further includes instructions for receiving a selection of a second application as a destination for the data selected. The computer readable medium further includes instructions for writing the data selected from the first application to a location in the second application.

The described embodiments of the present invention are advantageous as they allow for the quick and easy transfer of data from one application to another. This results in a more pleasurable and less time-consuming experience while word processing or otherwise editing a document on an information processing system. Another advantage of the present invention is the reduction in the number of steps necessary for effectuating the copy and paste process. This results in increased usability and user-friendliness of the information processing system on which the word processing or document editing is being performed.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

Figure 1:
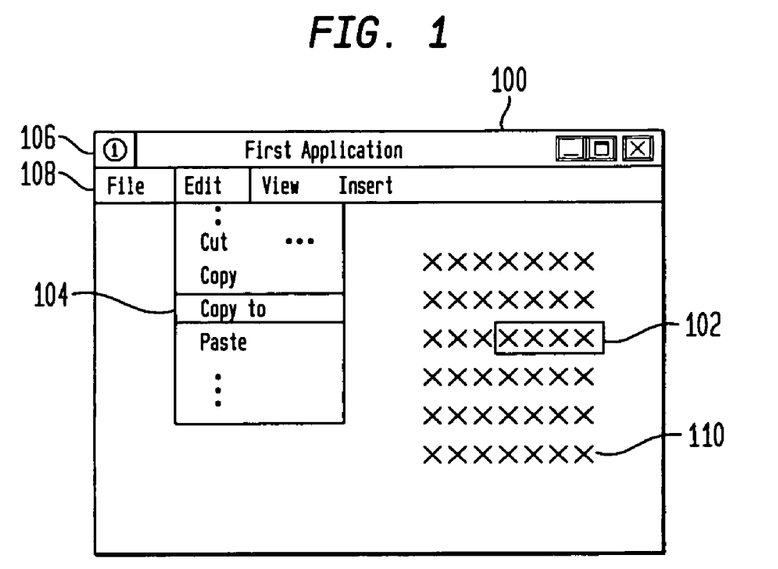
FIG. 1 is an illustration of a graphical user interface showing the process of selecting the copy-to command, according to one embodiment of the present invention.

FIG. 1 is an illustration of a graphical user interface (GUI) 100 showing the process of selecting the copy-to command, according to one embodiment of the present invention. In an exemplary embodiment, the GUI 100 provides a human interface for a first application that allows a user to word process. The present invention, however, applies to any application that provides a human interface for a first application that allows a user to edit any type of document. GUI 100 represents a GUI commonly known as a window or tile having a control bar 106 along the top of the GUI 100 and a menu bar 108 underneath the control bar 106. The control bar 106 includes the name of the first application. The menu bar 108 provides menu bar selections commonly used for word processing, such as file, edit, view and insert. Upon activation of a menu bar selection of the menu bar 108, such as through clicking of a mouse button or pressing of a keyboard key or combination of keyboard keys, a pull down menu is provided to the user.

FIG. 1 shows that GUI 100 includes an edit area 110 wherein a user can interact with the first application and effectuate word processing or general editing functions. In this example, edit area 110 includes text, graphics or other data that is edited by the user of the first application and GUI 100. A mouse pointer, which is a graphical icon, is moved by the user utilizing the mouse and indicates a location or insertion point to the user. In a word processor, an insertion point indicates a location in a document wherein the next character, text unit or other data will be inserted.

FIG. 1 further shows that the user has selected or highlighted a subset of data 102, such as text. The user typically performs the task of selecting or highlighting a subset of data by moving the mouse pointer to the beginning of the selected data 102, pressing the left mouse button at the start of the selected data 102, maintaining the left mouse button depressed as the user moves the mouse pointer to the end of the selected data 102 and releasing the left mouse button when the user locates the mouse pointer at the end of the selected data 102. An alternative way to perform the task of selecting or highlighting a subset of data is to move the insertion point to the beginning of the selected data 102 using the keyboard, pressing the shift key on the keyboard at the start of the selected data 102, maintaining the shift key depressed as the user moves the insertion point to the end of the selected data 102 using the keyboard and releasing the shift key when the user locates the insertion point at the end of the selected data 102.

Subsequent to selecting data 102, the user can activate a pull down menu 104 by pressing the edit menu bar selection of the menu bar 108. The pull down menu 104 provides a list of common word processing edit commands, such as cut, copy and paste. The cut command typically copies the selected data to a clipboard or memory allocation, and then removes the selected data from the edit area. The copy command typically copies the selected data to the clipboard. The paste command typically inserts data from the clipboard to the current insertion point in the word processor.

Optionally, the pull down menu also provides a copy-to command. In accordance with the present invention, the copy-to command allows a user to transfer data selected by the user from the first application to a second application. Upon selection of the copy-to command from the pull down menu 104, the user is presented with another pull down menu. This is further described with reference to FIG. 2. A user can select a command from the pull down menu 104 by placing the mouse pointer over the desired command and clicking the left mouse button. Alternatively, a user can select a command from the pull down menu 104 by navigating to the desired command using the keyboard and pressing the Enter keyboard key.

Figure 2:
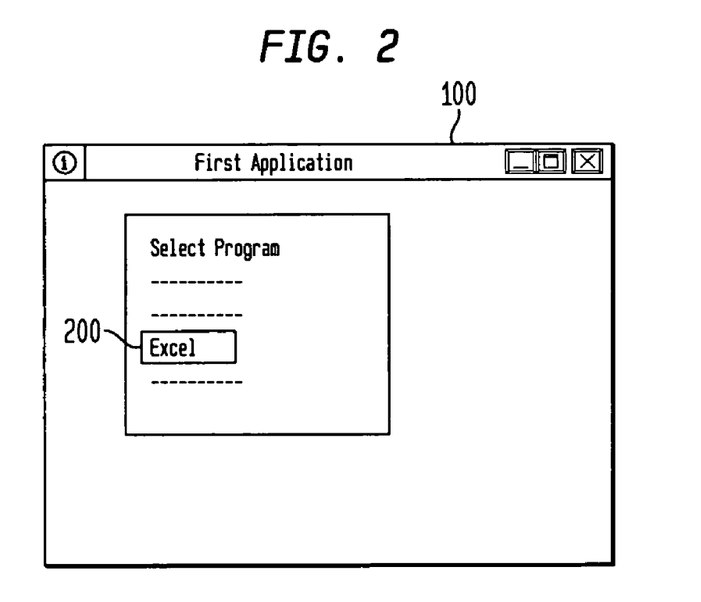
FIG. 2 is an illustration of a graphical user interface showing the process of selecting a second application, according to one embodiment of the present invention.

FIG. 2 is an illustration of the graphical user interface 100 showing the process of selecting a second application, according to one embodiment of the present invention. FIG. 2 shows that upon selection of the copy-to command from the pull down menu 104, the user is presented with another pull down menu 200, which supercedes or lays on top of the pull down menu 104. The pull down menu 200 provides a list of applications from which the user may choose.

The applications presented in pull down menu 200 are inactive applications. In conventional operating systems, only one application may be active at one time, restricting the input of information to one application for user convenience. Though other applications may be open and executing at the same time, only one application is deemed active and in the foreground so that user input is concentrated on one application. A user typically switches between active applications by clicking on the applications with a mouse. Herein, an active application refers to the application that is in the foreground of the user's computing environment and receiving the user's input. An inactive application refers to an application that is not being executed or an application that is open and executing but not active.

Upon being presented with the pull down menu 200 that provides a list of applications, the user may choose an application from the pull down menu. A user can select an application from the pull down menu 200 by placing the mouse pointer over the desired application and clicking the left mouse button. Alternatively, a user can select an application from the pull down menu 200 by navigating to the desired application using the keyboard and pressing the Enter keyboard key. Subsequent to the selection of an application from the pull down menu 200 by the user, the selected inactive second application is activated. If the selected second application is not being executed prior to this step, the second application is executed and becomes active. If the selected second application is open and executing, but not active, prior to this step, the second application becomes active. As a result, the first application is deemed inactive.

Figure 3:
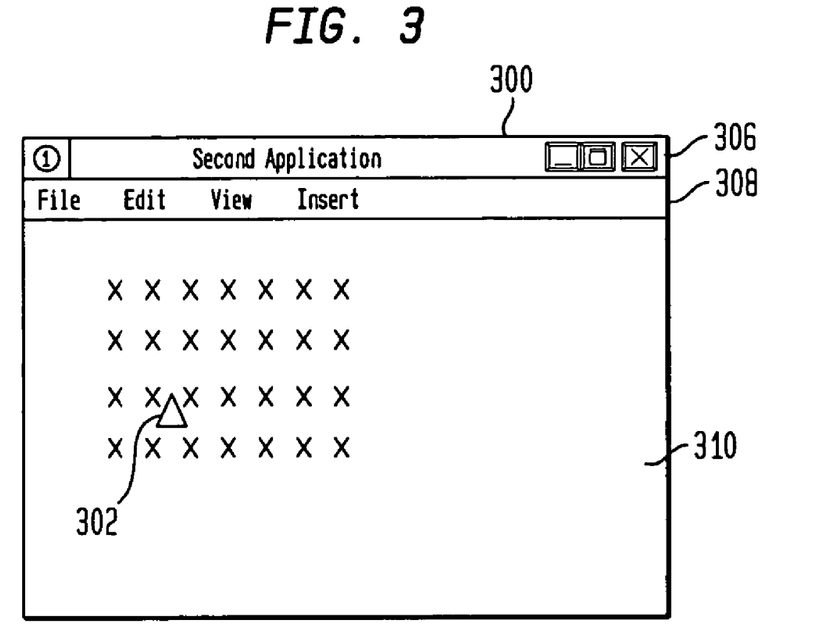
FIG. 3 is an illustration of a graphical user interface showing the process of selecting a location in the second application, according to one embodiment of the present invention.

FIG. 3 is an illustration of a graphical user interface 300 showing the process of selecting a location in the second application, according to one embodiment of the present invention. In an exemplary embodiment, the GUI 300 provides a human interface for a second application that also allows a user to word process. Like GUI 100, GUI 300 includes a control bar 306 along the top of the GUI 300 and a menu bar 308 underneath the control bar 306. The menu bar 308 provides menu bar selections commonly used for word processing, such as file, edit, view and insert. FIG. 3 shows that GUI 300 includes an edit area 310 wherein a user can interact with the second application and effectuate word processing or general editing functions. In this example, edit area 310 includes text, graphics or other data.

Subsequent to the second application, or GUI 300, becoming active, the user proceeds to define an area or a location for insertion of the selected data 102. In one embodiment of the present invention, the user simply clicks on the location 302 wherein he desires the selected data 102 to be inserted. As a result, the selected data 102 is automatically inserted at the insertion point 302, without requiring any other interaction from the user. In another embodiment of the present invention, the user clicks on the location 302 wherein he desires the selected data 102 to be inserted. In addition, he must select a menu bar selection, such as the edit menu bar selection in the menu bar 308, activate a pull down menu of the menu bar selection and select a command, such as a paste command. As a result, the selected data 102 is automatically inserted or pasted at the insertion point 302.

In another embodiment of the present invention, the user selects or highlights a subset of data in the second application or GUI 300. As a result, the selected data 102 is automatically inserted at the selected area, without requiring any other interaction from the user. Any data that was selected or highlighted by the user in the second application is automatically overwritten by the selected data 102. Alternatively, the user selects or highlights a subset of data in the second application or GUI 300. In addition, he must select a menu bar selection, such as the edit menu bar selection in the menu bar 308, activate a pull down menu of the menu bar selection and select a command, such as a paste command. As a result, the selected data 102 is automatically inserted at the selected area. Any data that was selected or highlighted by the user in the second application is automatically overwritten by the selected data 102.

Figure 4:
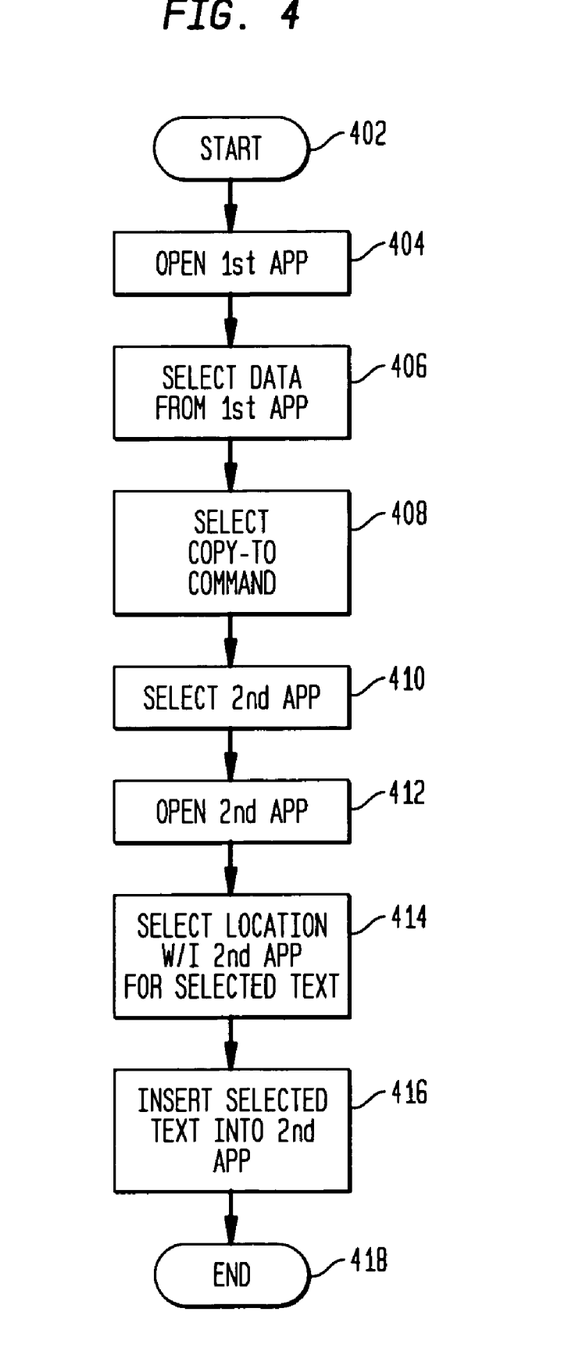
FIG. 4 is a flowchart showing the control flow of the process of one embodiment of the present invention.

FIG. 4 is a flowchart showing the control flow of the process of one embodiment of the present invention. FIG. 4 shows the process by which user-selected data is transferred from one application to another. The control flow of FIG. 4 begins with step 402 and flows directly to step 404. In step 404, a user opens or selects for execution a first application. The first application is the active application of the user's computing environment.

In step 406, the user has selects or highlights a subset of data 102, such as text from the first application. In step 408, subsequent to selecting data 102, the user selects the copy-to command, which allows a user to transfer data selected by the user from the first application to a second application. Upon selection of the copy-to command, the user is presented with a choice of applications from which the user may choose. In step 410, the user chooses a second application. In step 412, subsequent to the selection of the second application by the user, the selected inactive second application is activated. If the selected second application is not being executed prior to this step, the second application is executed and becomes active. If the selected second application is open and executing, but not active, prior to this step, the second application becomes active. As a result, the first application is deemed inactive.

In optional step 414, subsequent to the second application becoming active, the user proceeds to define an area or a location for insertion of the selected data into the second application. Note that this step is optional and may not occur. In the case that step 414 does not occur, in step 416, the selected data is automatically inserted at a default insertion point in the second application.

For example, if a user receives an email including contact data, such as contact data included in a V-card format, he may desire to save the data in another application. In this example, the user may highlight the contact data in step 406, select the copy-to command in step 408 and choose a second application (such as a contact information manager) in step 410. Subsequently, the second application is automatically activated in step 412 and in step 416 the selected data is automatically inserted at a default insertion point in the second application. In our example, a default insertion point would be to create a new contact item and insert the contact information into the new item. Alternatively, the second application may prompt the user to authorize the copying of the selected data to the default location and may provide the user with additional locations for insertion of the selected data.

In another example, a user may desire to use a dictionary to review the meaning of a word being viewed in a first application. In this example, the user may highlight the word in step 406, select the copy-to command in step 408 and choose a second application (such as an online dictionary) in step 410. Subsequently, the second application is automatically activated in step 412 and in step 416 the word is automatically inserted at a default insertion point in the second application. In our example, a default insertion point would be to write the word into a search text field, which is then activated for searching the meaning of a word.

In yet another example, a user may desire to perform a web search of a word or phrase being viewed in a first application. In this example, the user may highlight the word or phrase in step 406, select the copy-to command in step 408 and choose a second application (such as a web browser) in step 410. Subsequently, the second application is automatically activated in step 412 and in step 416 the word or phrase is automatically inserted at a default insertion point in the second application. In our example, a default insertion point would be to write the word or phrase into a search text field, which is then activated for searching the web for the word or phrase.

In the case that step 414 does occur, in step 416, the selected data is automatically inserted at the insertion point defined by the user in the second application in step 414.

It should be noted that steps 406 through 416 of the control flow of FIG. 4 are not limited to the order in which they were described above. Steps 406 through 416 can be executed in any order having the same results as those described above.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. "Computer program" or "computer program product" in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, disk drive memory, CD-ROM, or other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 5:
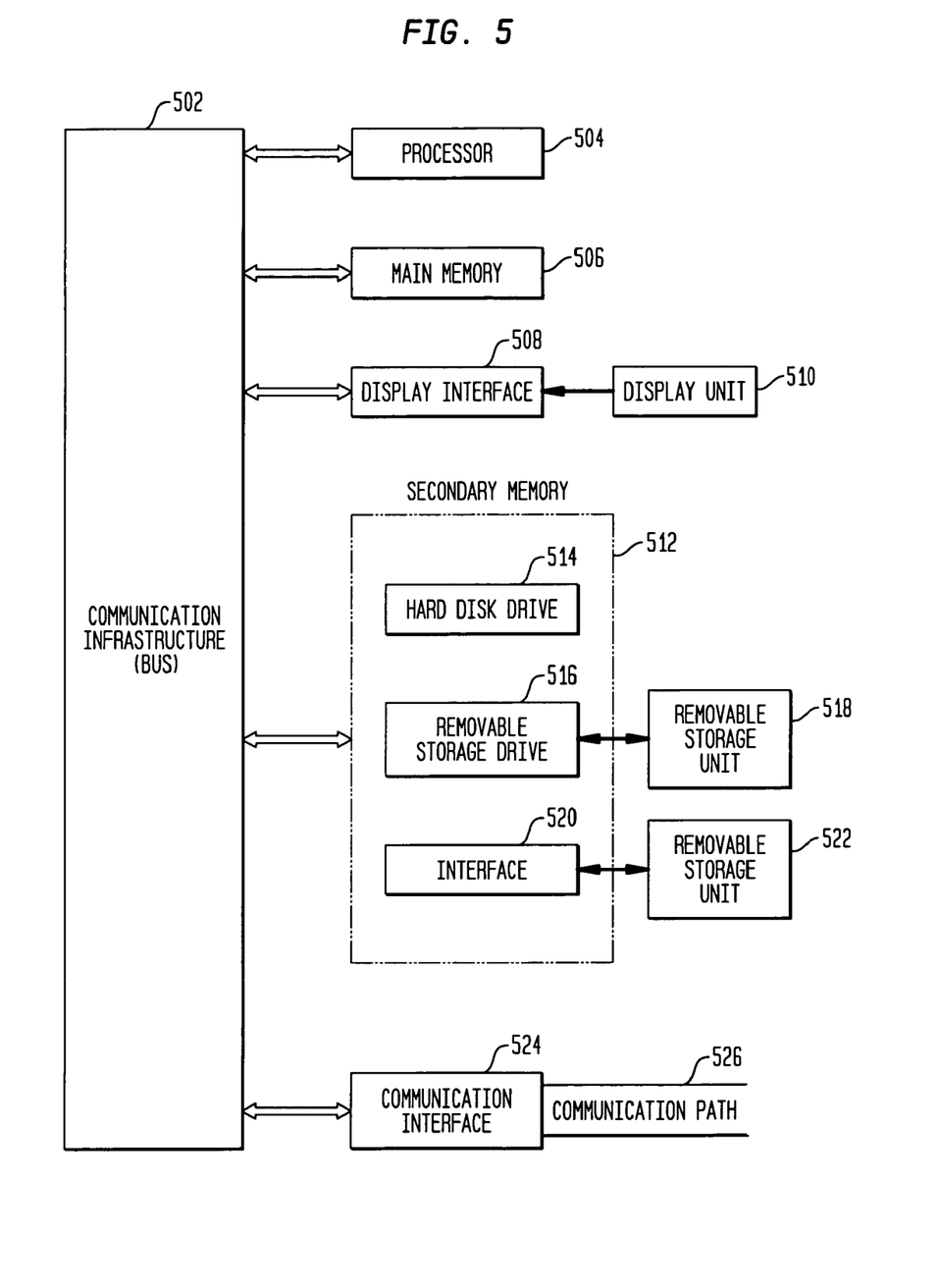
FIG. 5 is a high level block diagram showing an information processing system useful for implementing one embodiment of the present invention.

FIG. 5 is a high level block diagram showing an information processing system useful for implementing one embodiment of the present invention. The computer system includes one or more processors, such as processor 504. The processor 504 is connected to a communication infrastructure 502 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 508 that forwards graphics, text, and other data from the communication infrastructure 502 (or from a frame buffer not shown) for display on the display unit 510. The computer system also includes a main memory 506, preferably random access memory (RAM), and may also include a secondary memory 512. The secondary memory 512 may include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a manner well known to those having ordinary skill in the art. Removable storage unit 518, represents a floppy disk, a compact disc, magnetic tape, optical disk, etc. which is read by and written to by removable storage drive 516. As will be appreciated, the removable storage unit 518 includes a computer readable medium having stored therein computer software and/or data.

In alternative embodiments, the secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to the computer system.

The computer system may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (i.e., channel) 526. This channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 506 and secondary memory 512, removable storage drive 516, a hard disk installed in hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 506 and/or secondary memory 512. Computer programs may also be received via communications interface 524. Such computer programs, when executed, enable the computer system to perform the features of the present invention as discussed herein. In particular, the computer programs, when executed, enable the processor 504 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A method for transferring an object in a mobile telephone between documents, the method comprising:
using a mobile telephone processor operatively coupled with a communication infrastructure for:
receiving from a user a selection of a subset of data in a first document in a first application, the selecting step comprising an action selected from a group consisting of: a click selection from a third pull-down menu, clicking on the target location, and highlighting the target location;
receiving a user command to display a first pull-down menu on a graphical user interface, said first pull-down menu comprising a selection of commands for executing on the first application;
presenting the first pull-down menu to the user on the graphical user interface;
receiving a selection of a copy-to command from the first pull-down menu;
presenting a second pull-down menu on the graphical user interface, said second pull-down menu listing inactive documents in which data can be inserted, wherein the second pull-down menu supersedes the first pull-down menu; wherein the superseding comprises an action selected from a group consisting of: overlaying the first pull-down menu, and displaying the second pull-down menu in the foreground;
receiving from a user a selection of a second document from among the inactive documents, wherein the selection comprises highlighting of an object;
activating the second document and placing the first document in inactive status;

receiving from the user a selection of a target insertion area in the second document as a destination for the data selected; and inserting the selected subset of data at the target insertion area in the second document, wherein the inserting is executed responsive to, and immediately following the receipt of the selection of the target insertion area, without an intervening command.

2. The method of claim 1 wherein the step of receiving the selection of the subset of the data in the first document comprises receiving highlighting of any one of: text, image data, video data, audio data, and an object.

3. The method of claim 1 wherein the first and second applications are of different software types.

4. The method of claim 1 wherein the first and second applications are of same software types.

5. A method for transferring data from a mobile telephone having a limited user interface to a document in another information processing system, the method comprising:

using a processor operatively coupled with a communication infrastructure for:

selecting a subset of user-editable data from a first document in active status in a first application, wherein the selecting step comprises an action selected from a group consisting of: a click selection from a third pull-down menu, clicking on the target location, and highlighting the target location;

selecting a copy-to command for executing on the first document;

selecting a second document in a second application from among a set of inactive documents, wherein the selecting step brings the second document into active status and inactivates the first document; and selecting a target insertion area within the second document for insertion of the subset of user-editable data;

wherein selecting the target insertion area causes the subset of the user-editable data to be automatically inserted into the target insertion area within the second document, without any further user interaction and wherein the first and second applications are of different software types and the method comprises an action selected from a group consisting of: overlaying the first pull-down menu, and displaying the second pull-down menu in the foreground.

6. The method of claim 5 wherein the step of selecting the copy-to command comprises:

activating a first pull-down menu comprising a selection of commands for executing on the first document; and clicking a selection of the copy-to command from the first pull-down menu.

7. The method of claim 5 wherein the step of selecting the second document comprises:

activating a second pull-down menu listing available inactive documents; and clicking on the second document from among the documents listed on the second pull-down menu.

8. The method of claim 5 wherein the step of selecting the target insertion area comprises:

locating the target insertion area; and highlighting the target insertion area.

9. The method of claim 5 wherein the first and second applications are of different software types.

10. An information processing system on a mobile telephone comprising:

a limited user interface for providing a screen displaying a copy-to command; and a processor operatively coupled with the user interface, said processor configured to respond to:

a user command to display a first pull-down menu on the user interface, said first pull-down menu comprising a selection of commands for executing on a first document in a first application;

a selection of the copy-to command from the first pull-down menu, wherein the selecting comprises an action selected from a group consisting of: a click selection from a third pull-down menu, clicking on the target location, and highlighting the target location;

an indication of a subset of data selected in the first document in the first application;

a user command to display a second pull-down menu on the user interface, said second pull-down menu listing inactive documents in which data can be inserted, wherein the second pull-down menu supersedes the first pull-down menu, wherein the superseding comprises an action selected from a group consisting of: overlaying the first pull-down menu, and displaying the second pull-down menu in the foreground;

a selection of a second document from among the inactive documents, activating the second document and placing the first document in inactive status;

a selection of a target insertion area in the second document as a destination for the data selected; and inserting the selected data into the target insertion area in the second document in response to receiving the selection of only the copy-to command;

wherein the inserting is executed responsive to, and immediately following, the receipt of the selection of the target insertion area, without an intervening command.

11. The information processing system of claim 10, further comprising a memory for storing instructions for:

selecting the data from the first document, wherein the selecting comprises highlighting of an object;

selecting the copy-to command;

selecting the second document as a destination for the data selected; and copying the data selected to a location in the second document.

12. The information processing system of claim 10 wherein the data is user-editable data.

* * * * *